United States Patent
Nakatani et al.

(10) Patent No.: US 8,504,871 B2
(45) Date of Patent: *Aug. 6, 2013

(54) SAFETY OUTPUT DEVICE

(75) Inventors: Hiroshi Nakatani, Tokyo (JP); Makoto Toko, Saitama-ken (JP); Eigo Fukai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 311 days.

This patent is subject to a terminal disclaimer.

(21) Appl. No.: 12/882,552

(22) Filed: Sep. 15, 2010

(65) Prior Publication Data

US 2011/0173497 A1  Jul. 14, 2011

(30) Foreign Application Priority Data

Jan. 13, 2010  (JP) .................................. 2010-005190

(51) Int. Cl.
    *G06F 11/00* (2006.01)
(52) U.S. Cl.
    USPC .................................. 714/10; 714/11; 714/12
(58) Field of Classification Search
    USPC ............................................................ 714/10
    See application file for complete search history.

(56) References Cited

U.S. PATENT DOCUMENTS

| | | | | |
|---|---|---|---|---|
| 4,096,990 A * | 6/1978 | Strelow | ............................. | 714/11 |
| 4,222,515 A * | 9/1980 | Strelow | ............................. | 714/47.1 |
| 4,354,270 A * | 10/1982 | Nuding | ............................. | 714/47.1 |
| 4,520,482 A * | 5/1985 | Fourre et al. | ................. | 714/47.1 |
| 4,709,341 A * | 11/1987 | Matsuda | ............................. | 714/815 |
| 4,745,542 A * | 5/1988 | Baba et al. | ........................ | 700/79 |
| 4,785,453 A * | 11/1988 | Chandran et al. | ............... | 714/25 |
| 5,029,071 A * | 7/1991 | Kinoshita | ............................. | 714/11 |
| 5,030,822 A * | 7/1991 | Fukuyama | ................. | 250/214 R |
| 5,504,860 A * | 4/1996 | George et al. | ................... | 714/11 |
| 5,862,502 A * | 1/1999 | Giers | ............................. | 701/71 |
| 6,125,311 A * | 9/2000 | Lo | ................................. | 701/31.9 |
| 6,393,582 B1 * | 5/2002 | Klecka et al. | ................... | 714/11 |
| 6,948,092 B2 * | 9/2005 | Kondo et al. | ................... | 714/12 |
| 8,010,213 B2 * | 8/2011 | Moddemann | ................... | 700/79 |

FOREIGN PATENT DOCUMENTS

| | | |
|---|---|---|
| JP | 64-18804 | 1/1989 |
| JP | 3630583 | 12/2004 |
| JP | 2007-66246 | 3/2007 |
| JP | 4131134 | 6/2008 |

OTHER PUBLICATIONS

Office Action (with Englishj translation) mailed on Mar. 22, 2013, in counterpart Japanese Application No. 2010-005190 (7 pages).

* cited by examiner

*Primary Examiner* — Kamini Patel
(74) *Attorney, Agent, or Firm* — Oblon, Spivak, McClelland, Maier & Neustadt, L.L.P.

(57) ABSTRACT

A safety output includes an output controller to make an instruction to output normal output data and first self-diagnosis pattern data synchronously with a control cycle, a normal output unit to output the normal output data synchronously with the control cycle, a test pattern generating unit to encode the self-diagnosis pattern data into a pulse train signal having a pulse width not larger than a preset value and output the pulse train signal in accordance with a baseband transmission system, a combination output unit to combine the pulse train signal with the normal output signal and output the resultant signal, a reconfiguration unit to decode the inputted operation-terminal-portion output signal to reconfigure the operation-terminal-portion output signal as second self-diagnosis pattern data, and a comparator to compare the first self-diagnosis pattern data with the second self-diagnosis pattern data to judge the presence or absence of a difference.

7 Claims, 4 Drawing Sheets

SAFETY OUTPUT DEVICE

CROSS REFERENCE TO RELATED APPLICATION

This application is based upon and claims the benefit of priority from the prior Japanese Patent Application No. 2010-5190, filed on Jan. 13, 2010, the entire contents of which are incorporated herein by reference.

BACKGROUND

1. Field

The invention relates to an input-output device of a control apparatus that monitors and controls a plant or field equipment, or more specifically to a safety output device provided with a self-diagnosis function.

2. Description of the Background

A safety control system required to be highly reliable, particularly, are now equipped with a control apparatus that monitors and controls a plant, field equipment, and the like and that has a self-diagnosis function to self-diagnose a failure of the control apparatus without human help.

FIG. 8 shows a configuration example of such a safety control system. In FIG. 8, a safety control system 100 includes, for example, an input terminal portion 12, such as a sensor, that detects a state of a control target 200 such as a nuclear power plant or field equipment, a control apparatus 11 that receives an output from the input terminal portion 12 as an input signal and generates an output signal to control an operation terminal portion 13, such as valve, in accordance with a pre-stored control program, and the operation terminal portion 13.

The control apparatus 11 includes an input device 11b that receives a signal from the input terminal portion 12 as an input signal, an arithmetic device 11a that calculates an arithmetic output corresponding to the input signal, and an output device 11c that sends the arithmetic output to the operation terminal portion 13.

Incidentally, a device integrally having the input device 11b and the output device 11c is sometimes referred to an input-output device or an I/O device, as well.

For example, recent safety equipment serving as the input terminal portion 12 and being connected to the control apparatus 11 such as a programmable logic controller (PLC) outputs a self-diagnosis pulse signal periodically for a self-diagnosis. The self-diagnosis pulse signal is an off signal which has an extremely short pulse width (e.g., 20 μsec). The safety equipment checks whether or not there is any anomaly in an output system by feeding the self-diagnosis pulse signal back to the safety equipment itself.

The PLC may erroneously take a self-diagnosis pulse signal as an operating signal into a main body in the PLC. In this context, Japanese Patent No. 4131134, for example, discloses a control apparatus capable of performing a stable sequence control even when being connected to an external device that outputs a self-diagnosis pulse signal, and also discloses an input circuit for the control apparatus and a signal input method for the control apparatus.

The input circuit according to Japanese Patent No. 4131134 sets an interval period which is known in advance as a period in which no self-diagnosis pulse signal is generated from the safety equipment, and separates an operation-output step signal from the self-diagnosis signal received from the external device, i.e., the safety equipment to take only the operation-output step signal into the main body of the control apparatus (PLC).

Meanwhile, Japanese Patent No. 3630583 discloses a method and an apparatus for online diagnosis of a fail-safe switch of safety equipment serving as the operating terminal potion 13.

In the meantime, Japanese Patent Application Publication No. 2007-66246 discloses a system and method for self-diagnosis of a controller including diagnosis execution means provided independently of a main processor in order to perform safety control and a highly accurate self-diagnosis at the same time.

In general, a self-diagnosis pulse signal, from a safety device, which is superimposed on signals from and to an input device and an output device of a control apparatus has a sufficiently smaller pulse width than those of normal input and output signals used for control so as to be distinguished from those normal input and output signals for control.

Incidentally, noise dependent on the installation environment of the control apparatus 11 interferes in an input line 100a connecting the input device 11b of the control apparatus 11 to the safety equipment such as the external input terminal portion 12, as well as in an output line 100b connecting the output device 11c of the control apparatus 11 to the safety equipment such as the external operating potion 13.

If the pulse width of a noise pulse caused by the noise and superimposed on signals on the input line 100a and the output line 100b is approximately equal to that of the self-diagnosis pulse signal, the self-diagnosis pulse signal cannot be distinguished from the noise pulse, causing a problem that a normal self-diagnosis cannot be performed.

As a countermeasure for the problem, the input device and the output device of a general safety control system are provided with noise filters on input terminals in order to remove the noise pulse having a pulse width equal to or smaller than that of the self-diagnosis pulse signal.

However, a noise removal method utilizing the frequency separation characteristics of the noise filter cannot completely separate foreign noise having wideband frequency components. Therefore, the method cannot distinguish unnecessary noise pulse signals from pulse signals which are generated due to a failure of the control target 200 or are generated as an indication of disconnection of any of the input line 100a and the output line 100b connecting the control apparatus 11 to the input terminal portion 12 and the operation terminal portion 13.

Accordingly, use of the noise filter may cause overlook of a pulse signal representing an indication of a failure, or false detection of a failure. Hence there is a problem that it is hard to detect errors of the input line 100a or the output line 100b.

Meanwhile, if the output device 11c performs a self-diagnosis using a self-diagnosis pulse signal, the self-diagnosis pulse signal might be superimposed on a signal to be sent to the operation terminal portion 13 or rarely to the control target 200.

For this reason, the pulse width of the self-diagnosis pulse signal is normally set to such a short pulse width that the operation terminal portion 13 connected to the output device 11c may not respond to the self-diagnosis pulse signal. Nevertheless, there is a problem that the self-diagnosis pulse signal may adversely affect behaviors of the control target 200 depending on the response performance of the operation terminal portion 13.

Moreover, in the above-described method of Japanese Patent No. 4131134 which sets an interval period known in advance as a period in which no self-diagnosis pulse signal is generated from the safety equipment, and temporally separates the operation-output step signal from the self-diagnosis signal received from the external device, there is a problem that the safety control and the self-diagnosis of the input-output device cannot be executed in parallel or at any selected timing.

SUMMARY

The invention has been made to solve the problems of conventional output devices of control apparatus. An object of the invention is to provide a safety output device, of a control apparatus, provided with a self-diagnosis function and capable of preventing an output signal from the output device from adversely affecting an operation terminal portion and of executing safe control less susceptible to noise and a self-diagnosis in parallel.

To achieve the above object, the invention provides a safety output device of a control apparatus characterized as follows. Specifically, the safety output device is configured to send normal output data sent from an arithmetic device of the control apparatus to an operation terminal portion and also to execute a self-diagnosis, and includes: an output controller configured to make an instruction to output normal output data calculated or designated by the arithmetic device and preset first self-diagnosis pattern data synchronously with a control cycle set by the arithmetic device; a normal output unit configured to convert the normal output data sent from the output controller into a digital signal and to output the digital signal as a normal output signal synchronously with the control cycle; a test pattern generating unit configured to encode the first self-diagnosis pattern data sent from the output controller into a pulse train signal having a pulse width equal to or smaller than a preset pulse width and to output the pulse train signal in accordance with a baseband transmission system; a combination output unit including a combining unit configured to combine the pulse train signal with the normal output signal to generate a combined output signal and an output interface unit configured to transform the combined output signal from the combining unit into an operation-terminal-portion output signal for the operation terminal portion through conversion into an operating signal level of the operation terminal portion, and to send the operation-terminal-portion output signal; a reconfiguration unit including an input interface unit configured to take in the operation-terminal-portion output signal and a pattern reconfiguration unit configured to decode the inputted operation-terminal-portion output signal and to thereby reconfigure the operation-terminal-portion output signal as second self-diagnosis pattern data; and a comparator configured to compare the first self-diagnosis pattern data with the second self-diagnosis pattern data to judge the presence or absence of a difference between the first self-diagnosis pattern data and the second self-diagnosis pattern data. The presence or absence of an anomaly is judged based on the difference between the first self-diagnosis pattern data and the second self-diagnosis pattern data compared to each other, whereby the output of the normal output data from the arithmetic device and the self-diagnosis are performed in parallel.

The invention can provide a safety output device, of a control apparatus, provided with a self-diagnosis function and capable of preventing an output signal from the output device from adversely affecting an operation terminal portion and of executing safe control less susceptible to noise and a self-diagnosis in parallel.

DETAIL DESCRIPTION OF THE INVENTION

Embodiments of the invention will be described with reference to the drawings.

First Embodiment

A first embodiment of a safety output device according to the invention will be described with reference to FIGS. 1 and 2.

Figure 8:
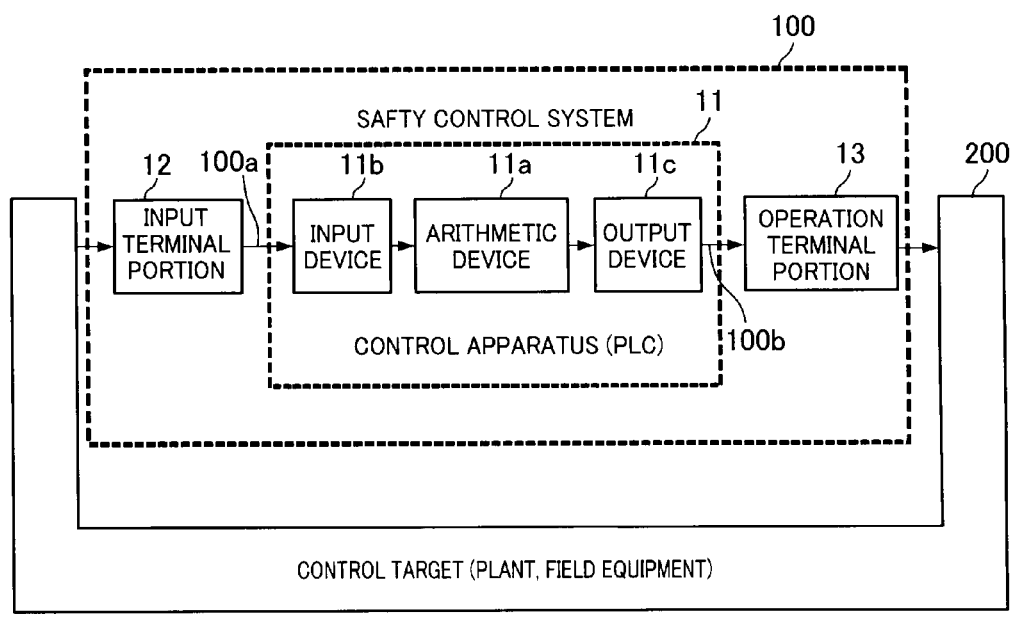
FIG. 8 is a configuration diagram of a safety control system.

Concerning a safety control system employing the safety output device, the same portions as those of the configuration described in FIG. 8 will be designated by the same reference numerals, and description of those portions will be omitted herein. To distinguish from the conventional output device 11c described in FIG. 8, the safety output device of the invention will be hereinafter referred to as a safety output device 11c.

Figure 1:
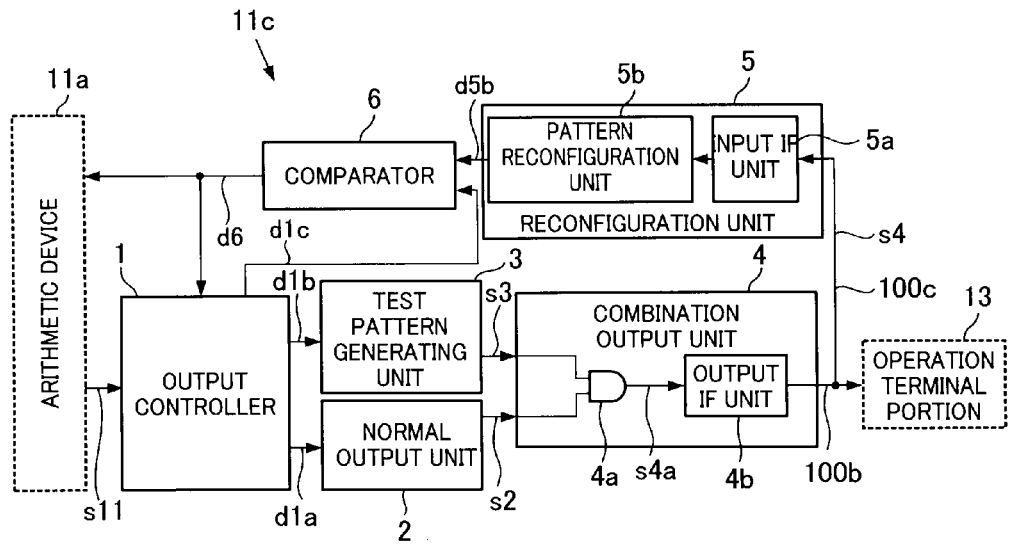
FIG. 1 is a configuration diagram of a safety output device according to a first embodiment of the invention.

In FIG. 1, the safety output device 11c of the invention is provided to a control apparatus (not shown) configured to send an operation terminal portion 13 normal output data sent from an arithmetic device 11a of the control apparatus and also to perform a self-diagnosis.

The safety output device 11c includes an output controller 1, a normal output unit 2, a test pattern generating unit 3, and a combination output unit 4 including a combining unit 4a and an output interface unit 4b. The output controller 1 makes an instruction to output normal output data d1a calculated or designated by the arithmetic device 11a and to output preset self-diagnosis pattern data d1b synchronously with a control cycle set by the arithmetic device 11a. The normal output unit 2 converts the normal output data d1a sent from the output controller 1 into a digital signal and to output the digital signal as a normal output signal s2 synchronously with the control cycle. The test pattern generating unit 3 encodes the self-diagnosis pattern data d1b sent from the output controller 1 into a pulse train signal s3 having a pulse width not larger than a preset pulse width and outputs the pulse train signal s3 in accordance with, for example, a baseband transmission system. The combining unit 4a combines the pulse train signal s3 with the normal output signal s2, and an output interface unit 4b transforms a combined output signal s4a from the combining unit 4a into an operation-terminal-portion output signal s4 through conversion into an operating signal level of the operation terminal portion 13, and sends the operation-terminal-portion output signal s4.

The safety output device 11c further includes a reconfiguration unit 5 and a comparator 6. The reconfiguration unit 5 is provided with an input interface unit 5a to take in the operation-terminal-portion output signal s4 and a pattern reconfiguration unit 5b to reconfigure the inputted operation-terminal-portion output signal s4 as self-diagnosis pattern data by decoding the operation-terminal-portion output signal s4 in accordance with an inverse signal decoding procedure, for example, using a baseband demodulation system. The comparator 6 compares the preset self-diagnosis pattern data with the decoded self-diagnosis pattern data to judge the presence or absence of any difference between the preset self-diagnosis pattern data and the decoded self-diagnosis pattern data.

Next, detailed settings in the units will be described. The self-diagnosis pattern data d1b set by the output controller 1 and a setting change in the self-diagnosis pattern data d1b will be described below.

The self-diagnosis pattern data d1b are issued not as simple single pulses or multiple pulses of a fixed pattern, but as pulses of a data pattern different for each control cycle. Then, the test patter generating unit 3 converts the self-diagnosis pattern data d1b into the pulse train signal s3 in accordance with a coding system such as the baseband transmission system.

In this way, it is possible to reduce probability of accidental coincidence between the pulse train signal of the self-diagnosis pattern data d1b and a pulse signal of foreign noise superimposed on signals on an output line 100b connecting the safety output device 11c to the operation terminal portion 13 as well as on a read-back line 100c connecting an output terminal of the safety output device 11c to the reconfiguration unit 5.

Moreover, although it is very unlikely to occur, there might be a case where the pulse pattern of the foreign noise temporally coincides, and thus interferes, with the pulse pattern of the self-diagnosis pattern data d1b.

In such a case, since the self-diagnosis pattern data d1b issued from the output controller 1 are different every time the self-diagnosis function is operated, the probability of accidental coincidence between the pulse pattern of the self-diagnosis pattern data d1b and the pulse pattern of the foreign noise can be reduced to a negligible level by carrying out a failure judgment based on results of multiple diagnostic sessions.

As a consequence, it is possible to detect a failure or an indication of a failure without requiring the conventional configuration using noise filters to remove pulse signals attributable to foreign noise. Hence it is possible to improve reliability of the failure diagnostic function of the safety output device 11c.

Next, a setting of the pulse train signal of the test pattern generating unit 3 will be described. The pulse width of each encoded pulse signal is set to a sufficiently shorter length than time required for the operation terminal portion 13 to respond. In this way, the operation terminal portion 13 can respond only to the normal output signal component in the operation-terminal-portion output signal s4, but not to the pulse train signal component superimposed on the operation-terminal-portion output signal s4.

Therefore, the diagnostic function using the pulse train signal of the self-diagnosis pattern data d1b can send the operation terminal portion 13 a safe normal output signal (the operation-terminal-portion output signal s4).

Next, operations of the safety output device 11c thus configured will be described with reference to FIG. 2. FIG. 2 is a timing chart illustrating data output timings and input-output signals at the units in the safety output device 11c.

Figure 2:
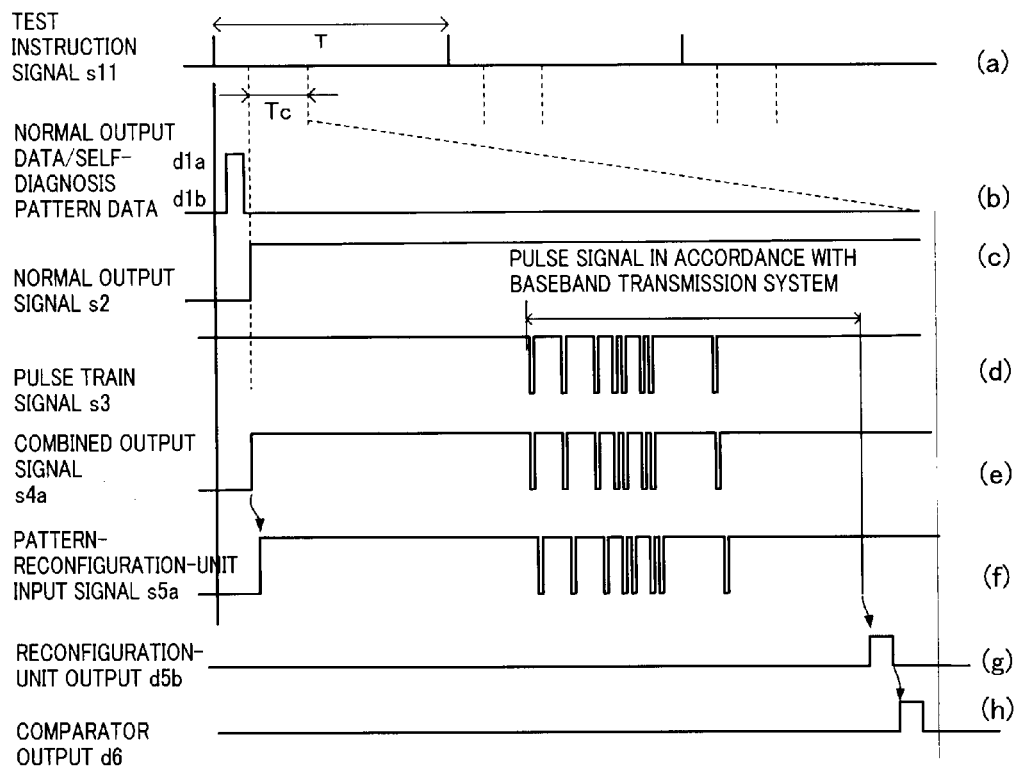
FIG. 2 is a timing chart illustrating operations in the first embodiment of the invention.

First, the output controller 1 of the safety output device 11c receives a test instruction signal s11 from the arithmetic device 11a synchronously with a control cycle signal ((a) in FIG. 2). Then, the output controller 1 sends the normal output unit 2 the normal output data d1a intended to be outputted from the arithmetic device 11a to the operation terminal portion 13, and sends the test pattern generating unit 3 the self-diagnosis pulse data d1b, at a timing shown in (b) in FIG. 2.

The normal output signal s2 is referred to as a normal DO output and configured with multiple bits. The normal output signal s2 changes slowly compared to the control cycle set by the arithmetic device 11a. (c) in FIG. 2 represents one bit out of the multiple bits of the normal output signal. Further, the definitions of signal logics of activeness and inactiveness may be changed as appropriate so as to deal with any cases.

Then, as shown in (c) in FIG. 2, the normal output unit 2 converts the normal output data d1a into the normal output signal s2 having a digital circuit logic level, and sends the normal output signal s2 to one of input terminals of the combining unit 4a. Meanwhile, as shown in (d) in FIG. 2, the test pattern generating unit 3 converts the sent self-diagnosis pulse data d1b into the pulse train signal s3 and sends the pulse train signal s3 to the other input terminal of the combining unit 4a in accordance with the baseband transmission system.

As shown in (e) in FIG. 2, the combining unit 4a calculates a logical product of the normal output signal s2 and the pulse train signal s3 and thereby combines the signals into the combined output signal s4a. Moreover, the output interface unit 4b converts the signal into the operation-terminal-portion output signal s4 having an operation level of the operation terminal portion 13 and outputs the operation-terminal-portion output signal s4.

The input interface unit 5a of the reconfiguration unit 5 reads back the operation-terminal-portion output signal s4 as shown in (f) in FIG. 2, and converts the operation-terminal-portion output signal s4 into a signal (s5a) having the digital circuit logic level. The pattern reconfiguration unit 5b decodes the converted logic level signal s5a at a timing shown in (g) in FIG. 2, and sends the comparator 6 decoded self-diagnosis pattern data d5b.

The comparator 6 receives diagnosis comparison control data d1c from the output controller 1. The diagnosis comparison control data d1c contains the self-diagnosis pulse data d1b instructed by the output controller 1. Then, the comparator 6 compares the preset self-diagnosis pulse data d1b with the decoded self-diagnosis pattern data d5b to judge the presence or absence of any difference between the data d1b and d5b, and sends a result as comparator output data d6 to the arithmetic device 11a and the output controller 1 at a timing shown in (h) in FIG. 2.

The timing to judge the presence or absence of an anomaly by means of data comparison between the preset self-diagnosis pattern data d1b and the decoded self-diagnosis pattern data d5b is set so that the judgment may be executed within a specific diagnostic period Tc in the control cycle T controlled by the arithmetic device 11a and that the output of the normal output data and the self-diagnosis may be performed in parallel.

The safety output device has been described based on the assumption that the operation-terminal-portion output signal is a digital output signal. However, the safety output device can be adapted easily for a case where the operation-terminal-portion output signal is an analog signal, by disposing a digital analog converter (DAC) circuit at an output terminal of the combination output unit 4 and by disposing an analog digital converter (ADC) at an input terminal of the reconfiguration unit 5 into which the read-back signal is inputted.

As described above, according to the invention, it is possible to execute the safe self-diagnosis even when foreign noise is superposed on signals on the output line and the read-back line.

Moreover, the self-diagnosis can be executed without interrupting, namely in parallel with, the output of the normal output data sent from the arithmetic device to the operation terminal portion. Accordingly, the self-diagnosis can be executed constantly to allow prevention of an oversight of a failure.

Therefore, when a safety instruction such as a stop instruction is issued from the arithmetic device, a signal indicating such instruction can be surely sent to the operation terminal portion. Hence there is less risk of putting a control target in a critical condition.

Second Embodiment

Figure 3:
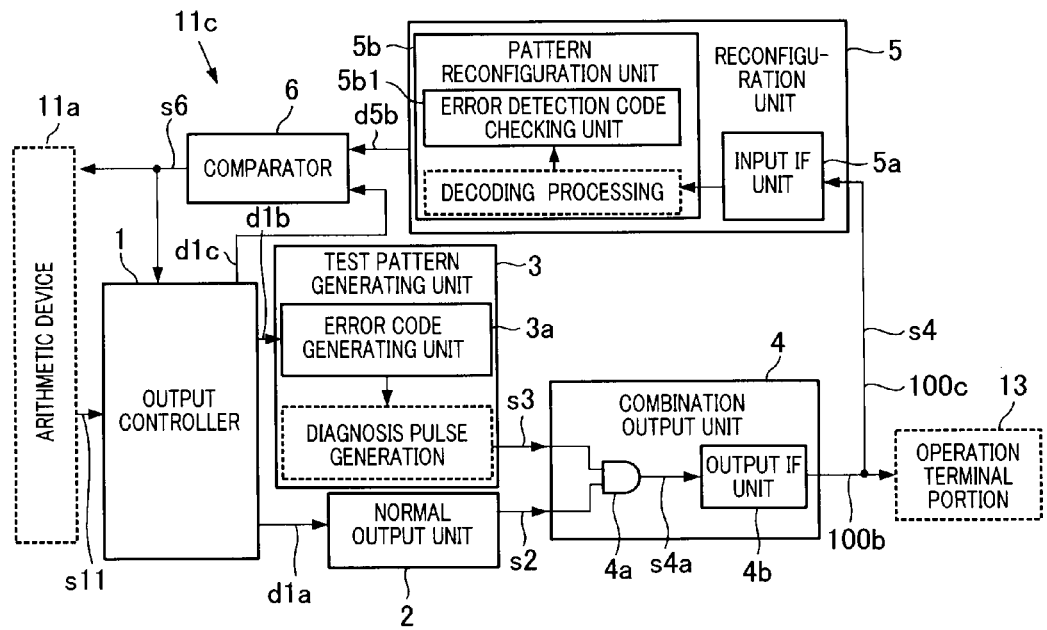
FIG. 3 is a configuration diagram of a safety output device according to a second embodiment of the invention.

Next, a safety output device according to a second embodiment will be described with reference to FIG. 3. Portions in the second embodiment which are the same as those shown in FIG. 1 will be designated by the same reference numerals, and description of those portions will be omitted.

The second embodiment is different from the first embodiment in the following respects. Specifically, in the first embodiment, the test pattern generating unit 3 generates only the self-diagnosis pattern data. In contrast, in the second embodiment, the test pattern generating unit 3 is provided with an error code generating unit 3$a$ to attach an error detection code to the self-diagnosis pattern data. Moreover, the pattern reconfiguration unit 5$b$ of the reconfiguration unit 5 is provided with an error detection code checking unit 5$b$1 configured to check the error detection code attached and decoded.

Another difference is that the comparator 6 compares the preset self-diagnosis pattern data with the decoded self-diagnosis pattern data obtained by excluding the code, to judge the presence or absence of any difference between the data.

Now, details of the second embodiment will be described below focusing on differences from the first embodiment. The test pattern generating unit 3 of the second embodiment sends the self-diagnosis pattern data d1$b$ received from the output controller 1 to the error code generating unit 3$a$ where, before the self-diagnosis pattern data d1$b$ is converted into the pulse train signal, an error detection code for detecting a data error is calculated using the received self-diagnosis pattern data d1$b$.

A function such as cyclic redundancy check (CRC) is used as the error detection code, for example. The error code generating unit 3$a$ generates self-diagnosis pattern data with code by attaching the calculated error detection code data having a fixed length to the end of the self-diagnosis pattern data d1$b$. The test pattern generating unit 3 converts the self-diagnosis pattern data with code into the pulse train signal s3 by an encoding method such as the baseband transmission system, and sends the pulse train signal s3 to one of input terminals of the combining unit 4$a$ of the combination output unit 4, where a logical product between the pulse train signal s3 and the normal output signal s2 sent to the other input terminal is calculated.

Then, the reconfiguration unit 5 decodes the input signal into the self-diagnosis pattern data with code in accordance with a signal decoding procedure inverse to that performed by the test pattern generating unit 3 by using, for example, the baseband demodulation system.

Thereafter, the error detection code checking unit 5$b$1 executes an error check of the self-diagnosis pattern data with code decoded by using the same cyclic redundancy check as that generated by the error code generating unit 3$a$. Then, the pattern reconfiguration unit 5$b$ sends the comparator 6 a result of the error check by the error detection code checking unit 5$b$1 and the self-diagnosis pattern data d5$b$ obtained by excluding the error detection code.

The comparator 6 compares the decoded self-diagnosis pattern data, with the preset self-diagnosis pattern data to judge the presence or absence of any difference between the decoded self-diagnosis pattern data and the preset self-diagnosis pattern data, and then sends the arithmetic device 11$a$ and the output controller 1$a$ result indicating whether the safety output device 11$c$ has a failure or not.

If the result of the error check by the reconfiguration unit 5 turns out to be an "error," the result can also indicate a possible failure of the safety output device 11$c$. For this reason, the comparator 6 may be omitted from the configuration. However, it is also possible to combine the error judgment by the reconfiguration unit 5 with the comparison diagnosis by the comparator 6.

Alternatively, the error code generating unit 3$a$ may be configured to generate the self-diagnosis pattern data with code by attaching an error detection correcting code to the self-diagnosis pattern data and to output the self-diagnosis pattern data with code as a pulse train signal s3 in accordance with the baseband transmission system.

What is usable as the error detection correcting code is an extended Hamming code capable of being processed with high speed and of simultaneously performing error correction of one bit and error detection of up to one bit.

According to the second embodiment configured as described above, it is possible to detect an anomaly of the data between the output controller 1 and the comparator 6 by using the self-diagnosis pattern data with code, and to thus detect an anomaly of the data to be outputted from the combination output unit 4 to the operation terminal portion 13.

Moreover, it is possible to further improve reliability of the failure diagnostic function of the safety output device 11$c$ by combining the error code check with the comparison diagnosis between the self-diagnosis pattern data and the read-back self-diagnosis pattern data.

Third Embodiment

Figure 4:
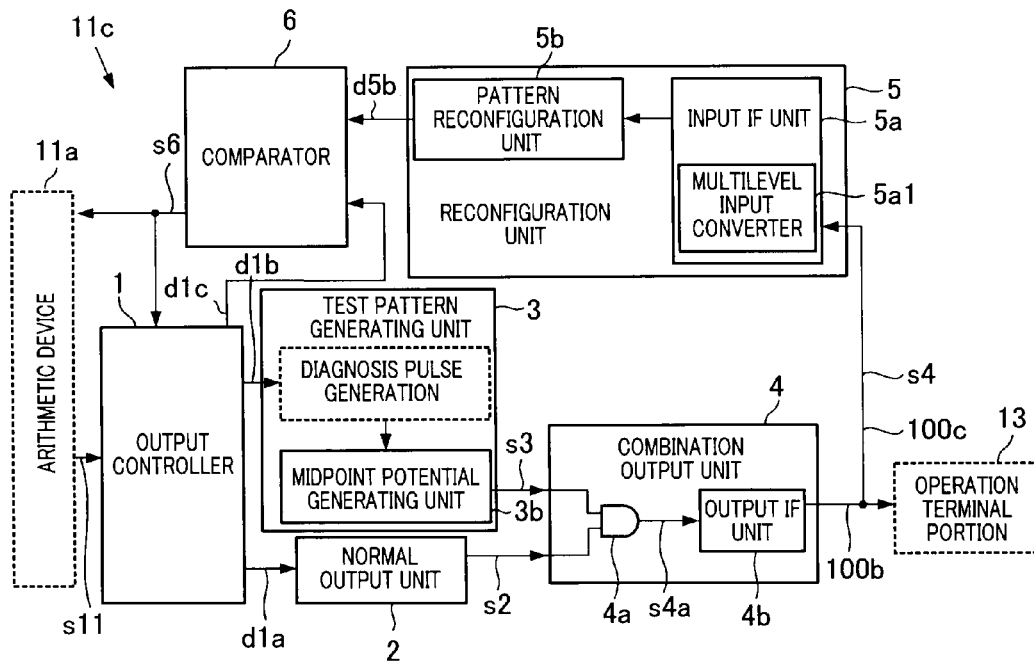
FIG. 4 is a configuration diagram of a safety output device according to a third embodiment of the invention.
Figure 5:
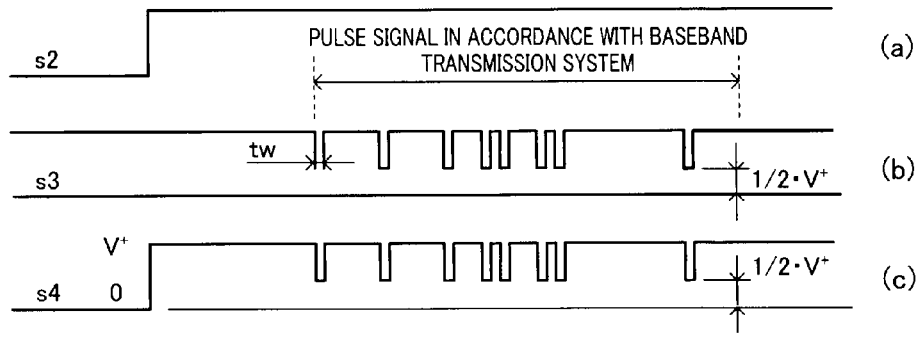
FIG. 5 is a timing chart illustrating self-diagnosis pulse signals in the third embodiment of the invention.

Next, a safety output device according to a third embodiment will be described with reference to FIGS. 4 and 5. Portions in the third embodiment which are the same as the portions shown in FIG. 1 will be designated by the same reference numerals, and description of those portions will be omitted.

The third embodiment is different from the first embodiment in the following respects. Specifically, the signal generated by the test pattern generating unit 3 in the first embodiment is a two-level pattern signal. In contrast, in the third embodiment, the test pattern generating unit 3 is provided with a midpoint potential generating unit 3$b$ configured to generate a multilevel signal, and the input interface unit 5$a$ for the read-back signal is provided with a multilevel input converter 5$a$1 configured to convert a multilevel input signal into a two-level signal.

Specifically, the test pattern generating unit further includes the midpoint potential generating unit 3$b$ that obtains a pulse train signal s3 by additionally giving a midpoint potential to the self-diagnosis pattern data, and that outputs the pulse train signal in accordance with the baseband-transmission-system. Here, the midpoint potential is at a higher level than a threshold potential based on which the operation terminal portion 13 recognizes a ground level. Accordingly, the operation terminal portion 13 does not respond to the pulse train signal. Hence there is an advantageous effect that, even when the safety output device 11$c$ is set to the ground level for some reason, the operation terminal portion 13 can recognize the ground level and initiate safe operations.

Next, the midpoint potential generating unit 3b and the multilevel input converter 5a1 will be described. The midpoint potential generating unit 3b converts the pulse train signal generated by the test pattern generating unit 3 into an electric signal to be outputted to the operation terminal portion 13 without changing the temporal timing.

Here, the midpoint potential of the pulse train signal s3 thus outputted is at a potential level of a stop signal to shut down a signal to be outputted from the combination output unit 4 as the operation-terminal-portion output signal s4. For example, as shown in FIG. 5, when the potential level of the operation-terminal-portion output signal s4 in normal operation is set to $V^+$ (e.g., a power supply voltage), and a potential level indicating the stop signal is set to 0 V (the ground potential), the midpoint potential generating unit 3b outputs the pulse train signal s3 having a potential level equal to $V^+$ at normal times and having a potential level equal to $\frac{1}{2} \cdot V^+$ as a pulse train signal reference potential.

The midpoint potential is set to a voltage higher than the threshold potential level based on which the operation terminal portion 13 recognizes the 0 V (ground potential) level.

Meanwhile, the normal output unit 2 converts the normal output data d1a sent from the output controller 1 into an electric signal to be outputted to the operation terminal portion 13, without changing the temporal timing. The potential level of the electric signal thus outputted is equal to that of the operation-terminal-portion output signal s4, like the first embodiment. For example, an active side is set to $V^+$, while an inactive side is set to 0 V (the ground potential).

The combination output unit 4 provided with a combining unit 4c and the output interface unit 4b combines the normal output signal s2 from the normal output unit 2 with the pulse train signal s3 from the midpoint potential signal generating unit 3b. When, for example, the potential of the pulse train signal s3 outputted from the midpoint potential generating unit 3b is $\frac{1}{2} \cdot V^+$ and the potential of the normal output signal s2 outputted from the normal output unit 2 is $V^+$, the potential of the operation-terminal-portion output signal s4 outputted from the composition output unit 4 is $\frac{1}{2} \cdot V^+$, as shown in FIG. 5(c), as a result of the combination.

Meanwhile, if the potential of the pulse train signal s3 outputted from the midpoint potential generating unit 3b is $V^+$ and the normal output signal s2 outputted from the normal output unit 2 is 0 V, the potential of the operation-terminal-portion output signal s4 outputted from the combination output unit 4 is 0 V. If the potential of the pulse train signal s3 outputted from the midpoint potential generating unit 3b is $V^+$ and the normal output signal s2 outputted from the normal output unit 2 is $V^+$, the potential of the operation-terminal-portion output signal s4 outputted from the combination output unit 4 is $V^+$.

Meanwhile, unlike the input interface unit 5a of the first embodiment, the multilevel input converter 5a1 is formed of a circuit which can distinguish three different potential levels from one another, namely, the active level, the inactive level, and the midpoint potential between these levels.

Since the operation-terminal-portion output signal s4 is sent with the midpoint potential as described earlier, the normal output signal and the pulse train signal for self-diagnosis are clearly distinguished from each other by the multilevel input converter 5a1 based on the difference in the signal potential. Then, the pulse train signal converted by the multilevel input converter 5a1 is sent to the pattern reconfiguration unit 5b.

Next, an advantageous effect of the third embodiment will be described. Like the first embodiment, the pulse width tw of the pulse train signal s3 is set sufficiently short so that the operation terminal portion 13 may not respond to the pulse train signal s3.

Moreover, according to the third embodiment, the pulse train signal s3 for self-diagnosis is sent at a voltage level higher than the threshold potential level based on which the operation terminal portion 13 recognizes the 0 V (ground potential) level.

Accordingly, among pulse-train-signal components and normal-output-signal components superimposed on the operation-terminal-portion output signal s4, the operation terminal portion 13 responds not to the pulse train signal components, but only to the normal output signal components. Hence it is possible to provide the safe output device 11c whose pulse train signal for self-diagnosis does not affect the operation end unit 13 either in a temporal perspective or in a level perspective.

Fourth Embodiment

Figure 6:
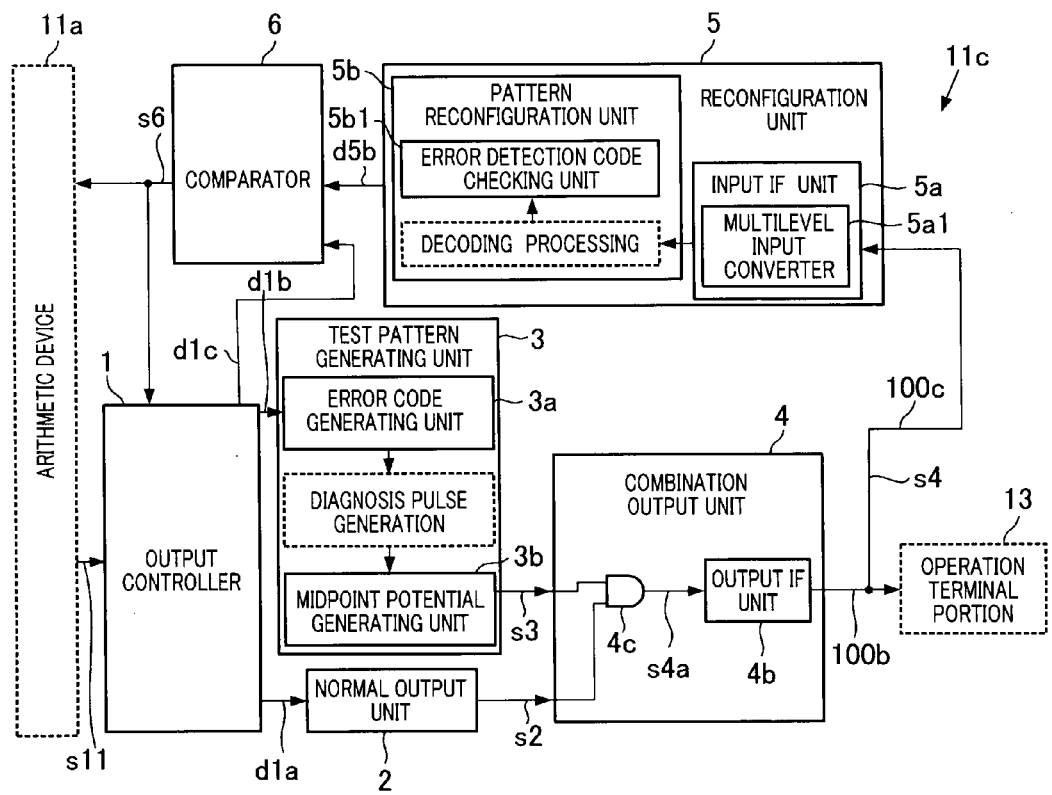
FIG. 6 is a configuration diagram of a safety output device according to a fourth embodiment of the invention.

Next, a safety output device according to a fourth embodiment will be described with reference to FIG. 6. Portions in the fourth embodiment which are the same as those shown in FIG. 1 will be designated by the same reference numerals, and description of those portions will be omitted.

The fourth embodiment is different from the first embodiment in the following respects. Specifically, the signal generated by the test pattern generating unit 3 in the first embodiment is a two-level pattern signal. In contrast, in the fourth embodiment, the test pattern generating unit 3 is provided with the error code generating unit 3a described in the second embodiment, and the midpoint potential generating unit 3b, described in the third embodiment, configured to generate a multilevel pulse train signal from self-diagnosis pattern data attached with an error detection code generated by the error code generating unit 3a. Moreover, the input interface unit 5a for the read-back signal is provided with the multilevel input converter 5a1 configured to convert a multilevel input signal into a two-level signal, and the error detection code checking unit 5b1 configured to perform an error code check on read-back data (pattern-reconfiguration-unit input data d5a) obtained by decoding the two-level signal from the multilevel input converter 5a1.

According to the fourth embodiment thus configured, the operation terminal portion 13 does not respond to the pulse train signal for self-diagnosis superimposed on the operation-terminal-portion output signal s4 either in a temporal perspective or in a level perspective, but responds only to the normal output signal component. Hence it is possible to execute the safe control and the self-diagnosis in parallel.

Moreover, the self-diagnosis pattern data per se has the error detecting function. Hence it is possible to perform the self-diagnosis in a high degree of freedom and to further improve reliability of the failure diagnosis of the safety output device 11c.

Fifth Embodiment

Figure 7:
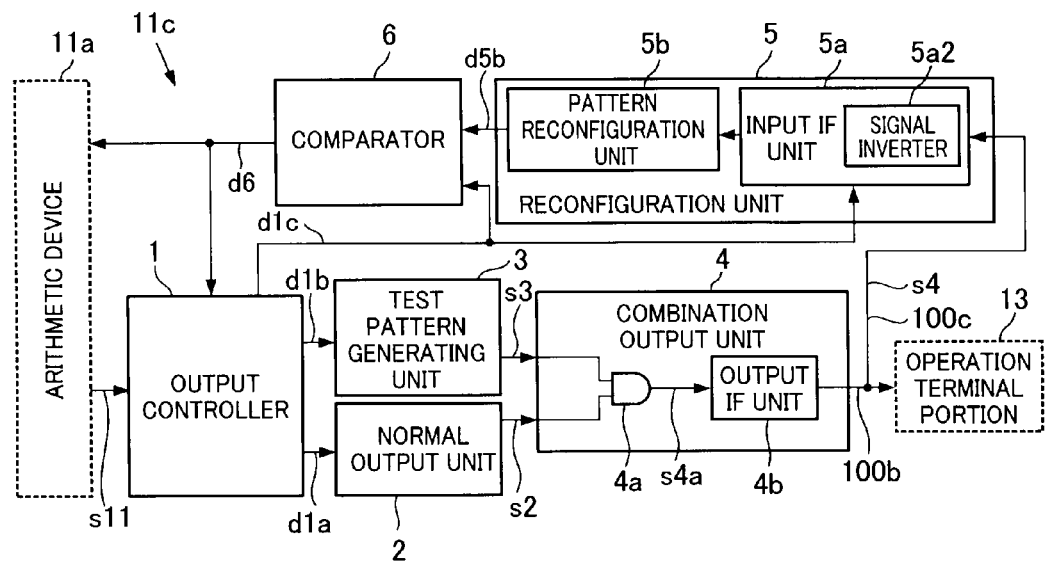
FIG. 7 is a configuration diagram of a safety output device according to a fifth embodiment of the invention.

Next, a safety output device according to a fifth embodiment will be described with reference to FIG. 7. Portions in the fifth embodiment which are the same as those shown in FIG. 1 will be designated by the same reference numerals, and description of those portions will be omitted.

The fifth embodiment is different from the first embodiment in the following respects. Specifically, the input interface unit 5a of the reconfiguration unit 5 includes a signal inverter 5a2 that inverts the normal output signal when the output controller 1 does not instruct output of the self-diagnosis pattern data. Meanwhile, the comparator 6 is configured to compare between the normal output data sent from the output controller 1 to the normal output unit 2 and the operation-terminal-portion output data inverted by the signal inverter 5a2, after inverting the logic of any one of the data.

Specifically, the diagnosis using the self-diagnosis pattern data according to the configuration of the first embodiment has a problem when the signal cannot be outputted at the 0 V potential due to disconnection of a ground signal line of the output line 100b or when the signal level of the normal output signal is recognized independently of the operation-terminal-portion output signal s4 inputted to the reconfiguration unit 5 due to disconnection of the read-back line 100c or a failure of the input interface unit 5a. In any of these cases, a failure cannot be detected until this signal level becomes 0 V.

On the other hand, according to the fifth embodiment, it is possible to change the input signal inputted to the reconfiguration unit 5 under a situation where the normal output signal does not change. Accordingly, it is possible to detect an error signal of the normal output signal which is read back by the above-described safety output device.

Moreover, according to the fifth embodiment, it is possible to further improve reliability of the self-diagnosis of the safety output device by adding the function described in the fifth embodiment without changing the cycle of execution of the diagnosis using the self-diagnosis data pattern.

It is to be understood that the invention shall not be limited to the above-described embodiments and that the self-diagnosis pattern data, the error code, the error detection correcting code, and the like can be modified into various optimum forms according to requirements, such as reliability and diagnostic time, of safety systems without departing from the scope of the present invention.

While various embodiments of the invention have been described above, these embodiments are described purely by way of example and are not intended to restrict the scope of the invention.

In fact, the novel devices described herein could be embodied in various other modes and, furthermore, without departing from the gist or sprit of the present invention, various omissions, substitutions and alternations could of course be effected in the mode of the devices described herein.

What is claimed is:

1. A safety output device of a control apparatus, the safety output device configured to send normal output data sent from an arithmetic device of the control apparatus to an operation terminal portion and also to execute a self-diagnosis, the safety output device comprising:
   an output controller configured to make an instruction to output normal output data calculated or designated by the arithmetic device and preset first self-diagnosis pattern data synchronously with a control cycle set by the arithmetic device;
   a normal output unit configured to convert the normal output data sent from the output controller into a digital signal and to output the digital signal as a normal output signal synchronously with the control cycle;
   a test pattern generating unit configured to encode the first self-diagnosis pattern data sent from the output controller into a pulse train signal having a pulse width equal to or smaller than a preset pulse width and to output the pulse train signal in accordance with a baseband transmission system;
   a combination output unit including a combining unit configured to combine the pulse train signal with the normal output signal to generate a combined output signal and an output interface unit configured to transform the combined output signal from the combining unit into an operation-terminal-portion output signal for the operation terminal portion through conversion into an operating signal level of the operation terminal portion, and to send the operation-terminal-portion output signal;
   a reconfiguration unit including an input interface unit configured to take in the operation-terminal-portion output signal and a pattern reconfiguration unit configured to decode the inputted operation-terminal-portion output signal and to thereby reconfigure the operation-terminal-portion output signal as second self-diagnosis pattern data; and
   a comparator configured to compare the first self-diagnosis pattern data with the second self-diagnosis pattern data to judge the presence or absence of a difference between the first self-diagnosis pattern data and the second self-diagnosis pattern data, wherein
   the presence or absence of an anomaly is judged based on the difference between the first self-diagnosis pattern data and the second self-diagnosis pattern data compared to each other, whereby the output of the normal output data from the arithmetic device and the self-diagnosis are performed in parallel.

2. The safety output device according to claim 1, wherein the test pattern generating unit further comprises an error code generating unit configured to generate self-diagnosis pattern data with code by attaching an error detection code to the first self-diagnosis pattern data and to output the self-diagnosis pattern data with code encoded as a pulse train signal in accordance with a baseband transmission system,
   the pattern reconfiguration unit comprises an error detection code checking unit configured to decode the operation-terminal-portion output signal in accordance with a baseband demodulation system, to perform an error code check by using the error detection code attached to the decoded data, and to send the comparator any one of a result of the error code check and the second self-diagnosis pattern obtained by excluding the error detection code from the decoded data, and
   the comparator detects a failure by using the result of the check or by comparing the first self-diagnosis pattern data with the second self-diagnosis pattern data to judge the presence or absence of a difference between the first self-diagnosis pattern data and the second self-diagnosis pattern data.

3. The safety output device according to claim 1, wherein the test pattern generating unit further comprises an error code generating unit configured to generate self-diagnosis pattern data with code by attaching an error detection correcting code to the first self-diagnosis pattern data and to output the self-diagnosis pattern data with code encoded as a pulse train signal in accordance with a baseband transmission system,
   the pattern reconfiguration unit comprises an error detection code checking unit configured to decode the operation-terminal-portion output signal in accordance with a baseband demodulation system, to perform an error code check by using the error detection code attached to the decoded data, and to send the comparator any one of a result of the error code check and the second self-diagnosis pattern obtained by excluding the error detection code from the decoded data, and the comparator detects a failure by using the result of the check or by comparing the first self-diagnosis pattern data with the second self-diagnosis pattern data to judge the presence or absence of a difference between the first self-diagnosis pattern data and the second self-diagnosis pattern data.

4. The safety output device according to claim 3, wherein the error detection correcting code is an extended Hamming code.

5. The safety output device according to claim 1, wherein the test pattern generating unit further comprises a midpoint potential generating unit configured to generate a pulse train signal in accordance with the baseband transmission system by additionally giving the first self-diagnosis pattern data a midpoint potential at a higher level than a threshold potential based on which the operation terminal portion recognizes a ground level, and the reconfiguration unit further comprises a multilevel input converter configured to convert the operation-terminal-portion output signal given the midpoint potential into a two-level logic signal by excluding the midpoint potential.

6. The safety output device according to claim 1, wherein the test pattern generating unit further comprises an error code generating unit configured to generate self-diagnosis pattern data with code by attaching an error detection code to the first self-diagnosis pattern data and to output the self-diagnosis pattern data with code encoded as a pulse train signal in accordance with a baseband transmission system, and a midpoint potential generating unit configured to generate a pulse train signal in accordance with the baseband transmission system by additionally giving the self-diagnosis pattern data with code a midpoint potential at a higher level than a threshold potential based on which the operation terminal portion recognizes a ground level, the pattern reconfiguration unit of the reconfiguration unit comprises an error detection code checking unit configured to decode the operation-terminal-portion output signal in accordance with a baseband demodulation system, to perform an error code check by using the error detection code attached, and to send the comparator any one of a result of the error code check and the second self-diagnosis pattern obtained by excluding the error detection code from the decoded data, and a multilevel input converter configured to convert the operation-terminal-portion output signal given the midpoint potential into a two-level logic signal by excluding the midpoint potential, and the comparator detects a failure by using the result of the check by the error detection code checking unit or by comparing the first self-diagnosis pattern data with the second self-diagnosis pattern data to judge the presence or absence of a difference between the first self-diagnosis pattern data and the second self-diagnosis pattern data.

7. The safety output device according to claim 1, wherein the input interface unit comprises a signal inverter configured to invert the operation-terminal-portion output signal, the operation-terminal-portion output signal is inverted when the output controller makes no instruction to output the first self-diagnosis pattern data, and the comparator compares the normal output data sent from the output controller to the normal output unit and operation-terminal-portion output data inverted by the signal inverter, after inverting logic of any one of the normal output data and the operation-terminal-portion output data.

* * * * *